(12) United States Patent
Berger et al.

(10) Patent No.: US 8,930,628 B2
(45) Date of Patent: *Jan. 6, 2015

(54) MANAGING IN-LINE STORE THROUGHPUT REDUCTION

(71) Applicant: International Business Machines Corporation, Armonk, NY (US)

(72) Inventors: Deanna P. Berger, Poughkeepsie, NY (US); Michael F. Fee, Cold Spring, NY (US); Christine C. Jones, Poughkeepsie, NY (US); Diana L. Orf, Somerville, MA (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/682,136

(22) Filed: Nov. 20, 2012

(65) Prior Publication Data
US 2013/0080705 A1    Mar. 28, 2013

Related U.S. Application Data

(63) Continuation of application No. 12/820,528, filed on Jun. 22, 2010, now Pat. No. 8,447,930.

(51) Int. Cl.
*G06F 12/14* (2006.01)
*G06F 12/08* (2006.01)
*G06F 9/52* (2006.01)

(52) U.S. Cl.
CPC ............ *G06F 12/0811* (2013.01); *G06F 9/524* (2013.01); *G06F 12/0855* (2013.01); *G06F 12/0897* (2013.01)
USPC ............................. 711/130; 711/145; 711/152

(58) Field of Classification Search
CPC .............................. G06F 12/084; G06F 9/524
USPC ............................................ 711/130, 145, 152
See application file for complete search history.

(56) References Cited

U.S. PATENT DOCUMENTS

| | | | |
|---|---|---|---|
| 6,178,493 B1 | 1/2001 | Lenk et al. | |
| 7,356,652 B1* | 4/2008 | Dew et al. ..................... | 711/146 |
| 7,590,784 B2 | 9/2009 | Math et al. | |
| 8,447,930 B2* | 5/2013 | Berger et al. .................. | 711/130 |
| 2004/0186945 A1* | 9/2004 | Jeter et al. ......................... | 711/5 |

* cited by examiner

*Primary Examiner* — Than Nguyen
(74) *Attorney, Agent, or Firm* — Fleit Gibbons Gutman Bongini & Bianco PL; Thomas Grzesik

(57) ABSTRACT

Various embodiments of the present invention manage a hierarchical store-through memory cache structure. A store request queue is associated with a processing core in multiple processing cores. At least one blocking condition is determined to have occurred at the store request queue. Multiple non-store requests and a set of store requests associated with a remaining set of processing cores in the multiple processing cores are dynamically blocked from accessing a memory cache in response to the blocking condition having occurred.

14 Claims, 5 Drawing Sheets

MANAGING IN-LINE STORE THROUGHPUT REDUCTION

CROSS-REFERENCE TO RELATED APPLICATIONS

This application is continuation of and claims priority from U.S. patent application Ser. No. 12/820,528 filed on Jun. 22, 2010, now U.S. Pat. No. 8,447,930, the disclosure of which is hereby incorporated by reference in its entirety.

FIELD OF THE INVENTION

The present invention generally relates to microprocessors, and more particularly relates to microprocessors supporting in-line stores.

BACKGROUND OF THE INVENTION

Multi-processor systems that comprise hierarchical store through cache structures have an increasing number of private store-through caches vying for access to shared embedded dynamic random access memory (EDRAM) caches. This generally results in a large amount of store traffic to the shared EDRAM cache that must be quickly processed to prevent store queues from backing up and holding up exclusive invalidates sent by other processors. Complicating this requirement is the utilization of the EDRAM for a large cache with a longer cache busy time. This translates to a longer interleave wait time and higher potential for live locks when competing with other requestors targeting the same interleaves.

SUMMARY OF THE INVENTION

In one embodiment, a method for managing a hierarchical store-through memory cache structure is disclosed. The method comprises associating a store request queue with a processing core in a plurality of processing cores. At least one blocking condition is determined to have occurred at the store request queue. A plurality of non-store requests and a set of store requests associated with a remaining set of processing cores in the plurality of processing cores are dynamically blocked from accessing a memory cache in response to the blocking condition having occurred.

In another embodiment, an information processing device for managing a hierarchical store-through memory cache structure is disclosed. The information processing device comprises a plurality of processing cores and at least one memory cache that is communicatively coupled to the plurality of processing cores. At least one cache controller is communicatively coupled to the at least one memory cache and the plurality of processing cores. The at least one cache controller is configured to perform a method. The method comprises associating a store request queue with a processing core in a plurality of processing cores. At least one blocking condition is determined to have occurred at the store request queue. A plurality of non-store requests and a set of store requests associated with a remaining set of processing cores in the plurality of processing cores are dynamically blocked from accessing a memory cache in response to the blocking condition having occurred.

In yet another embodiment, a computer program product for managing a hierarchical store-through memory cache structure is disclosed. The computer program product comprises a storage medium readable by a processing circuit and storing instructions for execution by the processing circuit for performing a method. The method comprises associating a store request queue with a processing core in a plurality of processing cores. At least one blocking condition is determined to have occurred at the store request queue. A plurality of non-store requests and a set of store requests associated with a remaining set of processing cores in the plurality of processing cores are dynamically blocked from accessing a memory cache in response to the blocking condition having occurred.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Operating Environment

Figure 1:
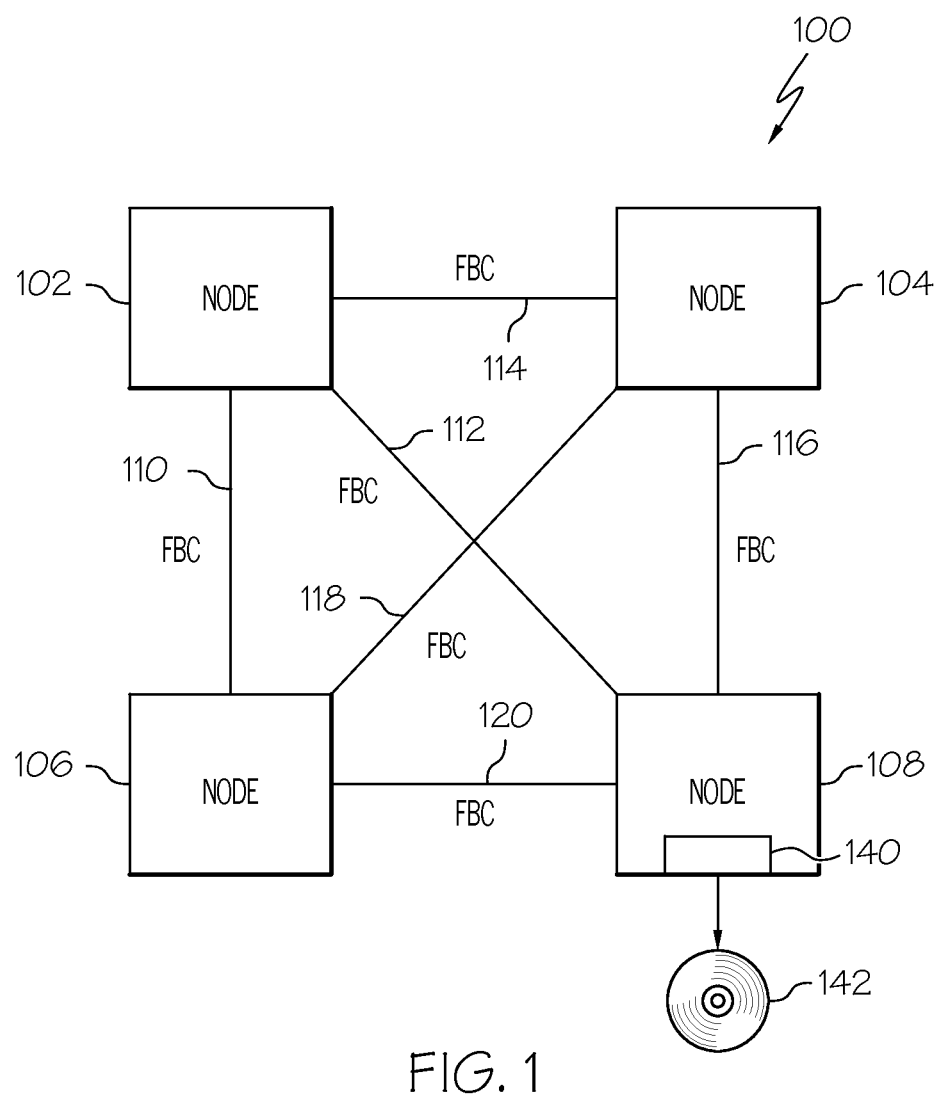
FIG. 1 is a block diagram illustrating one example of a computing system according to one embodiment of the present invention.
Figure 2:
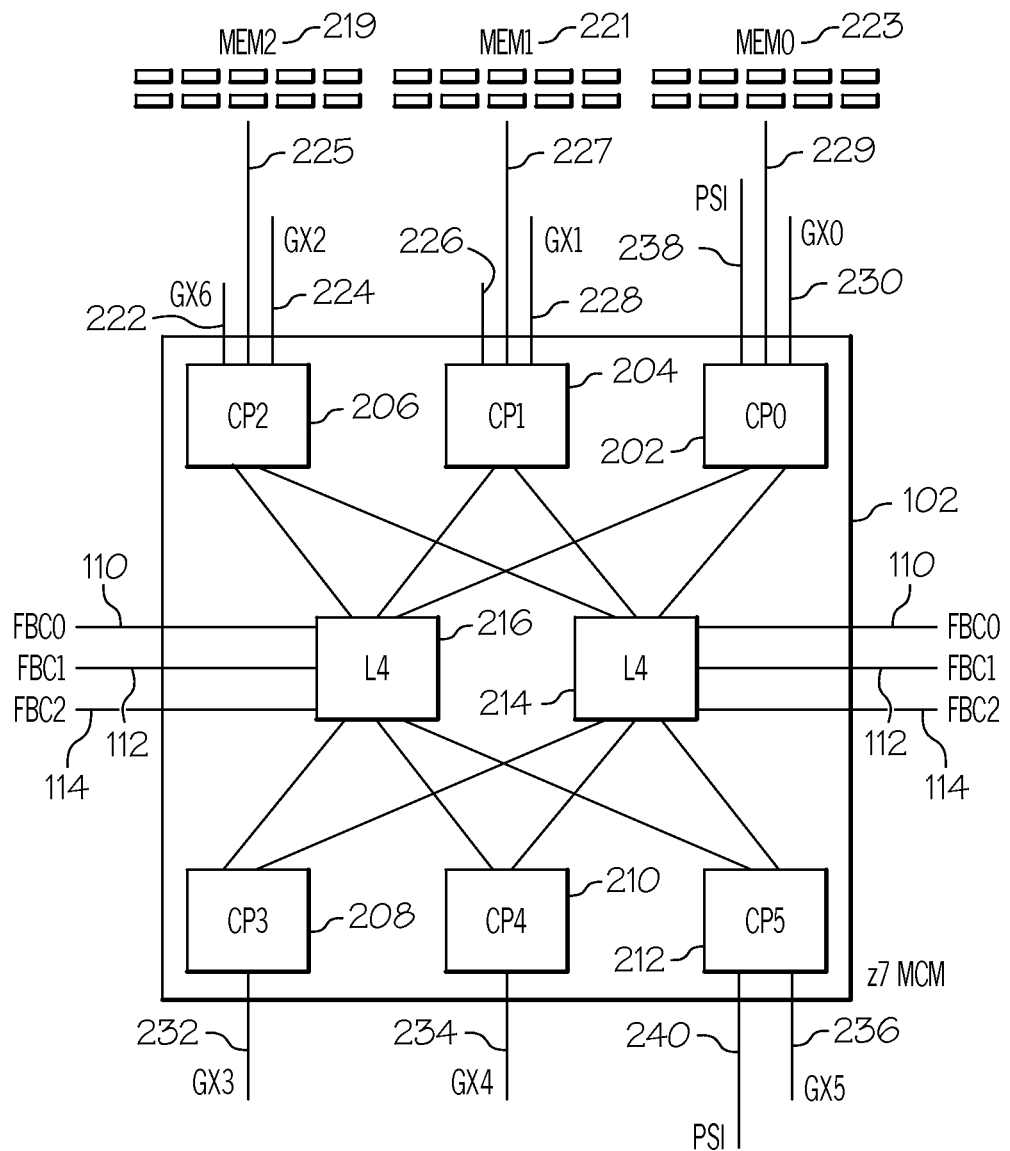
FIG. 2 is a block diagram illustrating one example of a computing node within the computing system of FIG. 1 according to one embodiment of the present invention.
Figure 3:
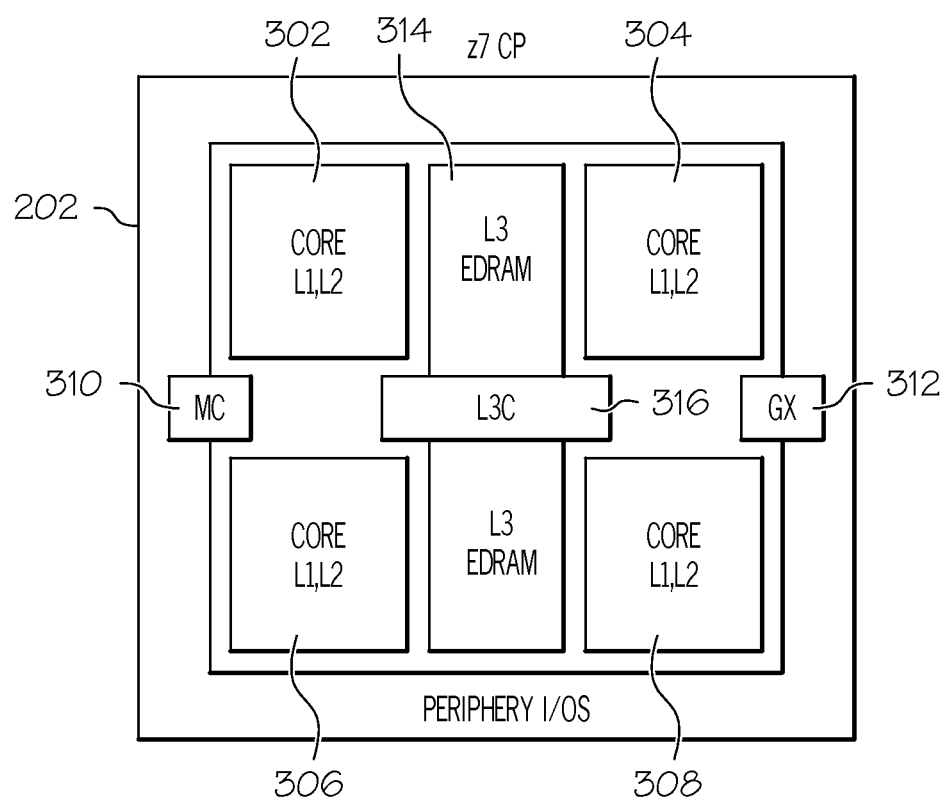
FIG. 3 is a block diagram illustrating one example of a processing chip within the node of FIG. 1 according to one embodiment of the present invention.

FIGS. 1-3 show one example of an operating environment applicable to various embodiments of the present invention. In particular, FIG. 1 shows a computing system 100 that comprises a plurality of computing nodes 102, 104, 106, 108. Each of these computing nodes 102, 104, 106, 108 are communicatively coupled to each other via one or more communication fabrics 110, 112, 114, 116, 118, 120. Communication fabric includes wired, fiber optic, and wireless communication connected by one or more switching devices and port for redirecting data between computing nodes. Shown on node 108 is a storage medium interface 140 along with a computer readable store medium 142 as will be discussed in more detail below. Each node, in one embodiment, comprises a plurality of processors 202, 204, 206, 208, 210, 212, as shown in FIG. 2. Each of the processors 202, 204, 206, 208, 210, 212 is communicatively coupled to one or more lower level caches 214, 216 such as an L4 cache. Each lower level cache 214, 216 is communicatively coupled to the communication fabrics 110, 112, 114 associated with that node as shown in FIG. 1. It should be noted that even though two lower level caches 214, 216 are shown these two lower level caches 214, 216, in one embodiment, are logically a single cache.

Figure 4:
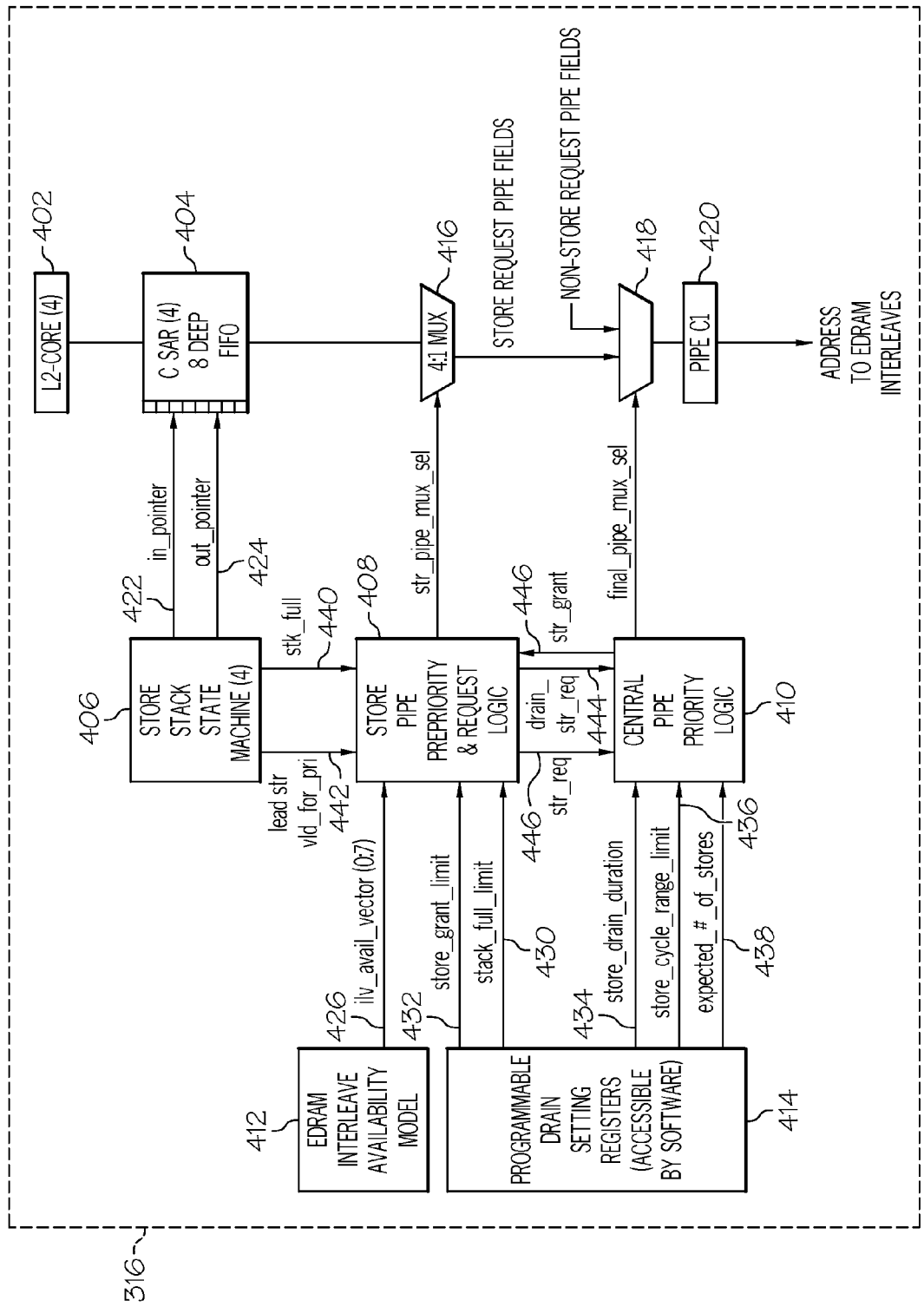
FIG. 4 is a block diagram illustrating one example of a cache controller that manages store pipe block requests according to one embodiment of the present invention.

A set of the processors 202, 204, 206 are communicatively coupled to one or more physical memories 219, 221, 223 via a memory port 225, 227, and 229. Each processor 204, 206, 208, 210, 212 comprises one or more input/output ports 222, 224, 226, 228, 230, 232, 234, 236. One or more of the processors 202, 212 also comprise service code ports 238, 240 Each processor 204, 206, 208, 210, 212, in one embodiment, also comprises a plurality of processing cores 302, 304, 308 with higher level caches such as L1 and L2 caches, as shown in FIG. 3. A memory controller 310 in a processor 202 communicates with the memory ports 218, 220, 222 to obtain data from the physical memories 219, 221, 223. An I/O controller 312 controls sending and receiving on the I/O ports 222, 224, 226, 228, 230, 232, 234, and 236. A processor 202 on a node 102 also comprises at least one L3 EDRAM cache 314 that is controlled by a cache controller 316. In one embodiment, the L3 EDRAM cache 314 and the L4 cache 214, 216 are shared by all processing cores in the system 100. In one embodiment, the L3 EDRAM cache 314 is a hierarchical store-through cache structure. The cache controller 316 comprises, among other things, store pipe pre-priority and request logic 408 and central pipe priority logic 410, as shown in FIG. 4, for managing in-line store throughput reduction, which is discussed in greater detail below.

Managing In-Line Store Throughput Reduction

As discussed above, multi-processor systems that comprise hierarchical store through cache structures have an increasing number of private store-through caches vying for access to shared embedded dynamic random access memory (EDRAM) caches. This generally results in a large amount of store traffic to the shared EDRAM cache that must be quickly processed to prevent store queues from backing up and holding up exclusive invalidates sent by other processors. Complicating this requirement is the utilization of the EDRAM for a large cache with a longer cache busy time. This translates to a longer interleave wait time and higher potential for live locks when competing with other requestors targeting the same interleaves.

Therefore, various embodiments of the present invention detect when the rate of store request processing decreases. In one embodiment, the cache controller 316 performs this detection and dynamically begins to block other non-store requestors from accessing the control pipeline and the EDRAM cache 314. Further, since the cache controller 316 is able to detect these store backups on a per processor basis, the cache controller 316 comprises a priority mechanism for the request of the pipeline block between stores from multiple processors. The cache controller 316 can also block stores from the non-winning processors as well as non-stores.

The following is a more detailed discussion of the in-line store throughput reduction management process briefly discussed above. The cache controller 316, in one embodiment, detects that store throughput for one (or more) processing cores 302, 304, 306, 308 is either slowing down or stalled. Store throughput can be decreased for many reasons. For example, in one embodiment, store requests have the lowest priority when requesting access to the L3 EDRAM cache 314. Also, store requests are required to be processed in the order that they arrive in the store queue/stack 404 (see FIG. 4), where each processing core in FIG. 3 comprises one store queue/stack 404. Therefore, no other store requests can be processed until the leading store request has been satisfied.

A store request is not allowed to send an access request to the L3 EDRAM cache 314 unless a set of interleaves are available for that particular store request. A set of interleaves indicate that a given memory space in the L3 EDRAM cache 314 is available for that particular store request. An EDRAM interleave availability model 412 (See FIG. 4) models when these interleaves are available and not available. Each store request is associated with a given set of interleaves. Therefore, even though the EDRAM interleave availability model 412 indicates that a given set of interleaves are available, if these available interleaves are not associated with this particular store request then this store request cannot access the L3 EDRAM cache 314. If the set of interleaves for this particular store request are available then the store request is able to make access request the L3 EDRAM cache 314. However, because store requests have the lowest priority of all request types, the store request gets locked out in many instances from accessing the L3 EDRAM cache 314.

Therefore, in one embodiment, the cache controller 316, on a per processor basis, monitors the store stack 404. The cache controller 316 determines when the store stack 404 becomes full and that the lead store request, e.g., the older store request, in the store stack 404 is waiting for its interleaves. A latch can be used to indicate that the store stack 404 is full. Alternatively, the cache controller 316 can count the number of store requests within the store stack 404. The cache controller 316 can determine that the lead store request is waiting for interleaves by analyzing a latch associated with the lead store request. For example, the lead store request can be associated with a latch that indicates whether or not the lead store request is waiting for interleaves.

Once the cache controller 316 determines that the store stack 404 is full and the lead request is waiting for interleaves or a grant from the central pipeline, the cache controller 316 initiates a drain store mechanism, which is discussed in greater detail below. It should be noted that the cache controller 316 can initiate the drain store mechanism as soon as it determines that the store stack 404 is full and the lead store request is waiting for interleaves. However, in other embodiments, the cache controller 316 can require the store stack 404 to be full for a given number of programmable cycles and/or that the lead store request is waiting for interleaves for a given number of programmable cycles.

In another embodiment, the cache controller 316, on a per processor basis, determines if the lead store request has received a central pipeline grant to access the L3 EDRAM cache 314 within a programmable number of cycles. A latch can be implemented that indicates the number of programmable cycles that is used as the threshold. A counter is maintained that is incremented for each cycle that the lead store request has waited for the central pipeline grant. The cache controller 316 analyzes the latch and the counter to determine if the value in the counter is equal to or above the value in the latch. If this is true then the cache controller 316 initiates the drain store mechanism.

In yet another embodiment, the cache controller 316 determines if there is less than an expected programmable number of stores that have been completed within a programmable sample window when active store requests exist. For example, the cache controller 316 monitors each store stack 404 and determines whether there are any active store requests. The cache controller 316 can determine if a stack 404 comprises active requests by monitoring a valid signal that is associated with each entry in the store stack 404. Each time a store receives a pipe grant the central pipeline logic 410 increments a counter that keeps track of the number of pipeline grants issued to stores. The counter is reset at the end of each programmable sample window. The cache controller 316 determines how many store requests have been completed across all processing cores in a programmable sample window and determines if the determined number of granted store requests is above or below an expected number of active store requests. If the number is below the threshold then the cache controller 316 initiates the drain store mechanism. For example, in 1000 cycles the expected number of granted store pipe requests can be 64. Therefore, in this example, if the cache controller 316 determines that for the last 1000 cycles only 32 active requests have been granted then the cache controller 316 initiates the drain store mechanism.

Once the drain store mechanism is triggered by any of the embodiments/conditions discussed above, the drain store mechanism rejects any requests in the pipe that are not store requests. Therefore, higher priority requests are not allowed access to the L3 EDRAM cache 314 allowing the store requests to access the L3 EDRAM cache instead. This way the store requests are satisfied and are no longer stalled. However, in some situations a store from a first processing core 302 is getting locked out by stores from one or more other processing cores 304. Therefore, in another embodiment, once the cache controller 316 determines that a processing core has blocked stores, the cache controller 316 also determines which processing core currently has the right to block out other requests and the other processing cores. In other words, if more than one processing core comprises a store stack in a state that triggers the drain store mechanism then these processing cores are processed in rank order.

For example, consider a processing_core_0 that comprises a store that is blocked and wants to initiate the drain store mechanism. The cache controller 316 determines if any other processing cores also comprise stores that are blocked from accessing the cache controller 316 according to the embodiments discussed above. If the cache controller 316 determines that no other processing core comprises a blocked store then the drain store mechanism can block all other requests from accessing the L3 EDRAM cache 314, as discussed above, including store requests from other cores. However, if the cache controller 316 determines that at least one other processing core such as processing_core_1 comprises a store that is blocked then the cache controller 316 determines which of the processing cores is currently able to perform the drain store.

In one embodiment, the cache controller 316 analyzes a latch associated with processing_core_0 and a latch associated with processing_core_1 (or a global latch associated with all processing cores). The latch comprises bits/flags that indicate whether or not a processing core has the ability to lock out other processing cores. In the current example, the cache controller 316 determines that processing_core_0 comprises the ability to lock out the other processing cores. Therefore, the cache controller 316 initiates the drain store mechanism for processing_core_0, which blocks all other requests and locks out processing_core_1 from accessing the L3 EDRAM cache 314. It should be noted that store stacks that become full while a processing core is blocked do not trigger a condition for initiating the drain store mechanism. Once the store(s) in processing_core_0 have accessed the L3 EDRAM cache 312 and has been satisfied, processing_core_0 updates its latch to point to processing_core_1. This indicates that processing_core_1 now has the ability to lock out the other processors. The cache controller 316 then implements the drain store mechanism for processing_core_1.

The embodiments discussed above for detecting a condition that indicates that stores are blocked/stalled can be implemented within a store pipe pre-priority and register logic and a central pipe priority logic within the cache controller 316 as shown in FIG. 4. FIG. 4 shows a plurality of processing cores 402 communicatively coupled to a respective store stack 404. Each store stack 404 is communicatively coupled to a respective store stack state machine 406. The state machine 406 is communicatively coupled to a store pipe pre-priority and register logic (SPPRL) 408. The SPPRL 408 is communicatively coupled to a central pipe priority logic (CPPL) 410, the EDRAM interleave availability model 412, and programmable drain setting registers 414 that are accessible by software. The CPPL 410 is also communicatively coupled to the programmable drain setting registers 414 as well. A MUX 416 such as a 4:1 MUX is communicatively coupled to the store stacks 404, the SPPRL 408, and to another MUX 418. This other MUX 418 is communicatively coupled to the CPPL 410 and a central pipe 420.

The SPPRL 408, in one embodiment, is used by the cache controller 316 to detect a condition when a store stack 404 is full and the lead store request is waiting for interleaves, as discussed above. The SPPRL 408, in one embodiment, is also used by the cache controller 316 to detect if the lead store request has received a central pipeline grant to access the L3 EDRAM cache 314 within a programmable number of cycles, as discussed above. The CPPL 410, in one embodiment, is used by the cache controller 316 to detect a condition when there is a less than an expected programmable number of stores that have been detected within a programmable sample window when active stores are present within a store stack 404.

As discussed above, store requests are received from each processing core 302, 304, 306, 308 and stored in the store stack 404 associated with the processing core that sent the request. Each store stack 404 is associated with one of the store stack state machines 406 that handles the in-gates shown by the "in_pointer" 422 into the store stack 404. The store stack state machine 406 detects the store command from the interface and in-gates the address into the respective store stack 404. The store stack state machine 406 uses the "in_pointer" 422 to point to the next open entry within the respective store stack 404 for incoming store requests and the "out_pointer" 424 to track which store request in the stack 404 is the next request that can request access to the L3 EDRAM cache 314.

The SPPRL 408 determines which store request from the multiple processing cores will be allowed into the central pipe 420 for accessing the L3 EDRAM cache 314. For example, the SPPRL 408 receives an indication "lead_str_vld_for_pri" 442 from the state machine 406 as to which store request in that stack 404 is the lead store. The SPPRL 408 then uses information from the EDRAM interleave availability model 412 to determine whether the store request can be sent into the central pipeline 420. For example, the EDRAM interleave availability model 412, as discussed above, keeps track of which portions of the L3 EDRAM cache 314 are available. The EDRAM interleave availability model 412 sends a vector "ilv_avail_vector(0:7)" 426 to the SPPRL 408 that indicates the interleaves that are available and not available. The SPPRL 408 uses the vector 426 to determine if the interleaves for a current store request are available. If the interleaves are not available as indicated by the vector 426, the SPPRL 408 does not include the store request in its pre-priority selection logic and, therefore, does not present the store request to the CPPL 410.

The SPPRL 408 and the CPPL 410 both receive programmable settings from the programmable drain setting registers 414 to detect for their respective conditions. For example, the SPPRL 408 receives a stack full value "stack_full_limit" 430 that indicates to the SPPRL 408 a given number of cycles that a stack 404 is required to be full in order to trigger the drain store operations. The SPPRL 408 also receives a programmable number of cycles for central pipeline grant access "stack_grant_limit" 432 that indicates to this logic the number of cycles without a central pipeline grant access that triggers the drain store mechanism. The CPPL 410 receives duration information "store_drain_information" 434 that indicates how many cycles to perform the drain stain operations discussed above. For example, the L3 EDRAM cache 314, in one embodiment, comprises at least two access times. Therefore, depending on the access time currently in use the blocking operations are performed for a different number of cycles. The CPPL 410 also receives a number of cycles "store_cycle_range_limit" 436 that indicates the number of cycles to monitor store requests. The CPPL 410 further receives a number of expected stores "expected_#_of stores" 438 that indicates how many stores are to be expected within the number of cycles.

The SPPRL 408 and the CPPL 410 use the programmable drain setting information to determine when one of the three conditions discussed above are true. For example, the SPPRL 408 receives a stack full indication "stk_full" 440 from the state machine 406 associated with that stack 404. The SPPRL 408 uses the "lead_str_vld_for_pri" 442 information discussed above to identify the leading store request. The SPPRL 408 also uses the "ilv_avail_vector(0:7) 426 information discussed above to determine if the leading store request has been waiting for its interleaves. If so, the SPPRL 408 can then determine if the number of cycles that the stack 404 has been full is less than, greater than, or equal to the "stack_full_limit" value 430 received from registers 414. If so, the SPPRL 408 can then initiate drain store operations by sending a request "drain_str_req" 444 to the CPPL 410, which performs the blocking operations discussed above for this condition.

In another example, the SPPRL 408 uses the "lead_str_vld_for_pri" 442 information discussed above to identify the leading store request. This logic also receives central pipe grant information "str_grant"446 associated with this lead store request from the CPPL 410. The SPPRL 408 uses the "str_grant" 446 information received from the CPPL 410 to increment the store grant counter and compares the current counter value with the "store_grant_limit" 432 information received from the registers 414. If the "str_grant" 444 information is greater than or equal to the "store_grant_limit" 432 information the SPPRL 408 then initiates drain store operations by sending a request "drain_str_req" 444 to the CPPL 410, which performs the blocking operations discussed above for this condition.

The CPPL 410, in one example, receives store request information "str_req" 446 from the SPPRL 408 that indicates a number of store requests detected. The CPPL 410 analyzes this "str_req" 446 information to determine a number of store requests detected within a number of given cycles as indicated by the "store_cycle_range_limit" 436 information discussed above. The CPPL 410 compares this detected number to the number of expected store requests as indicated by the "expected_#_of_stores" 438 information discussed above. If the detected number is less than or equal to the expected number of store requests then the CPPL 410 performs the blocking operations discussed above for this condition. It should be noted that in one embodiment, stores are blocked by the SPPRL 408 not driving the MUX 416 and non-store requests are blocked by the CPPL 410 not driving the other MUX 418.

As can be seen from the above discussion, various embodiments of the present invention detect when the rate of store request processing decreases. Non-store requesters are dynamically blocked from accessing the control pipeline and the EDRAM cache. A priority mechanism is used for the request of the pipeline block between stores from multiple processors. Stores from the non-winning processors can then be blocked from accessing the EDRAM cache as well as non-stores.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Operational Flow Diagrams

Figure 5:
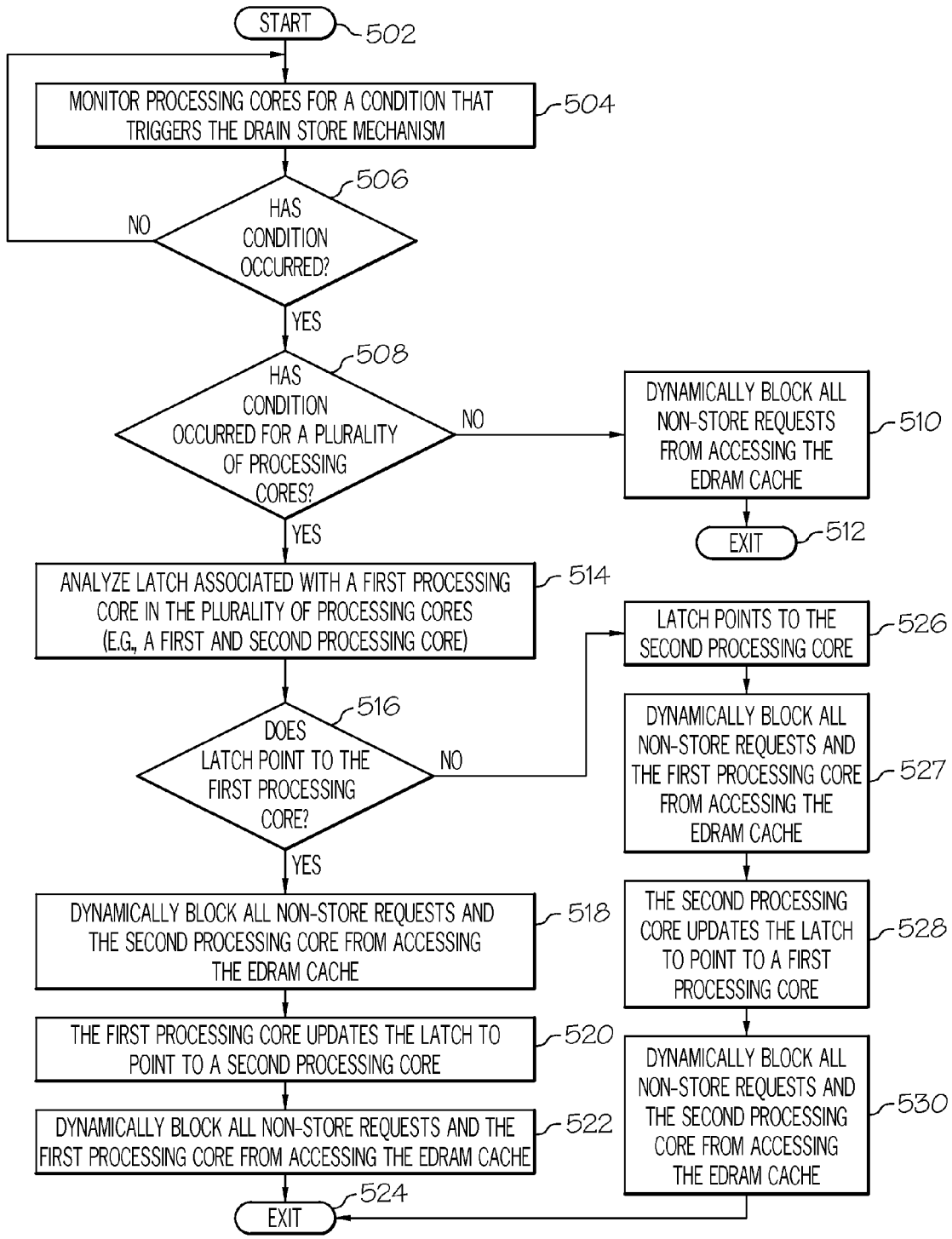
FIG. 5 is an operational flow diagram illustrating one example of a process for managing in-line store throughput reduction according to one embodiment of the present invention.

Referring now to FIG. 5, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 5 is an operational flow diagram illustrating one example of managing in-line store throughput reduction. The operational flow diagram begins at step 502 and flows directly to step 504. The cache controller 316, at step 504, monitors each processing core 302, 304, 306, 308 for a condition that triggers the drain store mechanism. For example, the cache controller the cache controller 316, on a per processor basis, determines when the store stack 404 becomes full and that the lead store request in the store stack 404 is waiting for its interleaves; determines, on a per processor basis, if the lead store request has received a central pipeline grant to access the L3 EDRAM cache 314 within a programmable number of cycles; and/or determines if there is less than an expected programmable number of stores that have been detected within a programmable sample window when active store requests exist.

The cache controller 316, at step 506, determines if a condition(s) has occurred. If the result of this determination is negative, the control flow returns to step 504. If the result of this determination is positive, the cache controller 316, at step 508, determines if a condition has occurred for two or more processing cores, a first and second processing core in this example. If the result of this determination is negative, the cache controller 316, at step 510 dynamically blocks all non-store requests from accessing the L3 EDRAM cache 314, as discussed above. The control flow then exits at step 512. If the result of this determination is positive, the cache controller 316, at step 514, analyzes a latch associated with a first processing core 302. The cache controller 316, at step 516, determines if the latch points to the first processing core 302.

If the result of this determination is positive, the cache controller 316, at step 518, dynamically blocks all non-store requests and the second processing core 304 from accessing the L3 EDRAM cache 314. Once the store requests at the first processing core 302 have been satisfied, the first processing core 302, at step 520, updates its latch to point to the second processing core 304. The cache controller 316, at step 522, dynamically blocks all non-store requests and the first processing core 302 from accessing the L3 EDRAM cache 314. The control flow then exits at step 524. If the result of the determination at step 516 is negative, the cache controller 316, at step 526, determines that the latch is pointing to the second processing core 304. The cache controller 316, at step 528, dynamically blocks all non-store requests and the first processing core 302 from accessing the L3 EDRAM cache 314. Once the store requests at the second processing core 304 have been satisfied, the second processing core 304, at step 530, updates its latch to point to the first processing core 302. The cache controller 316, at step 532, dynamically blocks all non-store requests and the second processing core 304 from accessing the L3 EDRAM cache 314. The control flow then exits at step 524.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method for managing a hierarchical store-through memory cache structure, the method comprising:
   associating a store request queue with at least one processing core of a plurality of processing cores;
   determining that at least one blocking condition has occurred at the store request queue, wherein the memory cache is an embedded dynamic random access memory (EDRAM) cache, and wherein determining that at least one blocking condition has occurred comprises:
      determining that the store request queue comprises a set of active store requests; and
      determining that a number of store requests received at the store request queue within a given programmable number of cycles is less than a given threshold; and
   dynamically blocking non-store requests and store requests associated with a remaining set of processing cores in the plurality of processing cores from accessing a memory cache, based on the blocking condition having been determined.

2. The method of claim 1, wherein determining that at least one blocking condition has occurred further comprises:
   determining that the store request queue is full and that a lead store request in the store request queue is waiting for at least one of a set of interleaves and a central pipeline grant associated with the EDRAM cache.

3. The method of claim 1, wherein the determining is performed on a per processing core basis.

4. The method of claim 1, further comprising:
   determining that at least one blocking condition has occurred at another store request queue associated with another processing core in the plurality of processing cores.

5. The method of claim 4, wherein the dynamically blocking further comprises:
   analyzing, based on determining that at least one blocking condition has occurred at one or more other store request queues associated with one or more other processing cores, at least one of a first latch associated with the processing core and a second latch associated with the one or more processing cores;
   determining that at least one of the first latch and the second latch points to the processing core; and
   dynamically blocking non-store requests and store requests associated with the remaining set of processing cores in the plurality of processing cores from accessing the EDRAM cache based on determining that at least one of the first latch and the second latch points to the processing core.

6. An information processing device for managing a hierarchical store-through memory cache structure, the information processing device comprising:
   a plurality of processing cores;
   at least one memory cache communicatively coupled to the plurality of processing cores; and
   at least one cache controller communicatively coupled to the at least one memory cache and the plurality of processing cores, wherein the at least one cache controller is configured to perform a method comprising:
      associating a store request queue with at least one processing core of the plurality of processing cores;
      determining that at least one blocking condition has occurred at the store request queue, wherein the memory cache is an embedded dynamic random access memory (EDRAM) cache, and wherein determining that at least one blocking condition has occurred comprises:
         determining that the store request queue comprises a set of active store requests; and
         determining that a number of store requests received at the store request queue within a given programmable number of cycles is less than a given threshold; and
         dynamically blocking non-store requests and store requests associated with a remaining set of processing cores in the plurality of processing cores from accessing the memory cache, based on the blocking condition having been determined.

7. The information processing device of claim 6, wherein determining that at least one blocking condition has occurred further comprises:
   determining that the store request queue is full and that a lead store request in the store request queue is waiting for at least one of a set of interleaves and a central pipeline grant associated with the EDRAM cache.

8. The information processing device of claim 6, wherein the determining is performed on a per processing core basis.

9. The information processing device of claim 6, wherein the method further comprises:
   determining that at least one blocking condition has occurred at another store request queue associated with another processing core in the plurality of processing cores.

10. The information processing device of claim 9, wherein the dynamically blocking further comprises:
    analyzing, based on determining that at least one blocking condition has occurred at one or more other store request queues associated with one or more other processing cores, at least one of a first latch associated with the processing core and a second latch associated with the one or more processing cores;
    determining that at least one of the first latch and the second latch points to the processing core; and
    dynamically blocking non-store requests and store requests associated with the remaining set of processing cores in the plurality of processing cores from accessing the EDRAM cache based on determining that at least one of the first latch and the second latch points to the processing core.

11. A computer program product for managing a hierarchical store-through memory cache structure, the computer program product comprising:
    a non-transitory storage medium readable by a processing circuit and storing instructions for execution by the processing circuit for performing a method comprising:
       associating a store request queue with at least one processing core of the plurality of processing cores;
       determining that at least one blocking condition has occurred at the store request queued wherein the memory cache is an embedded dynamic random access memory (EDRAM) cache, and wherein determining that at least one blocking condition has occurred comprises:
 determining that the store request queue comprises a set of active store requests; and
 determining that a number of store requests received at the store request queue within a given programmable number of cycles is less than a given threshold; and
 dynamically blocking non-store requests and store requests associated with a remaining set of processing cores in the plurality of processing cores from accessing the memory cache, in response to the blocking condition having been determined.

12. The computer program product of claim 11, wherein determining that at least one blocking condition has occurred further comprises:
 determining that the store request queue is full and that a lead store request in the store request queue is waiting for at least one of a set of interleaves and a central pipeline grant associated with the EDRAM cache.

13. The computer program product of claim 11, wherein the method further comprises:
 determining that at least one blocking condition has occurred at another store request queue associated with another processing core in the plurality of processing cores.

14. The computer program product of claim 13, wherein the dynamically blocking further comprises:
 analyzing, based on determining that at least one blocking condition has occurred at one or more other store request queues associated with one or more other processing cores, at least one of a first latch associated with the processing core and a second latch associated with the one or more processing cores;
 determining that at least one of the first latch and the second latch points to the processing core; and
 dynamically blocking non-store requests and store requests associated with the remaining set of processing cores in the plurality of processing cores from accessing the EDRAM cache based on determining that at least one of the first latch and the second latch points to the processing core.

* * * * *